(12) United States Patent
Dettinger et al.

(10) Patent No.: US 8,965,918 B2
(45) Date of Patent: *Feb. 24, 2015

(54) DECOMPOSED QUERY CONDITIONS

(71) Applicant: International Business Machines Corporation, Armonk, NY (US)

(72) Inventors: Richard D. Dettinger, Rochester, MN (US); Daniel P. Kolz, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 13/745,952

(22) Filed: Jan. 21, 2013

(65) Prior Publication Data

US 2013/0138633 A1 May 30, 2013

Related U.S. Application Data

(63) Continuation of application No. 11/463,364, filed on Aug. 9, 2006, now Pat. No. 8,423,569.

(51) Int. Cl.
*G06F 17/30* (2006.01)

(52) U.S. Cl.
CPC .... *G06F 17/30554* (2013.01); *G06F 17/30442* (2013.01); *G06F 17/30448* (2013.01); *G06F 17/30451* (2013.01)
USPC .............................. 707/769; 707/716; 707/722

(58) Field of Classification Search
CPC .................. G06F 17/30442; G06F 17/30554; G06F 17/30451; G06F 17/30961; G06F 17/30448; G06F 17/30398; G06F 17/30463; Y01S 707/99932; Y01S 707/99933; Y01S 707/99934
USPC .................. 707/716, 722, 999.003, 999.101, 707/E17.012, 756, 758, 769, 999.002, 707/999.004, 999.006, 999.102, 999.104
See application file for complete search history.

(56) References Cited

U.S. PATENT DOCUMENTS

| | | | |
|---|---|---|---|
| 5,742,806 A | 4/1998 | Reiner et al. | |
| 6,567,802 B1 * | 5/2003 | Popa et al. | 707/704 |
| 7,620,632 B2 * | 11/2009 | Andrews | 707/749 |
| 8,423,569 B2 | 4/2013 | Dettinger et al. | |
| 2006/0004817 A1 * | 1/2006 | Andrews | 707/802 |
| 2007/0168336 A1 | 7/2007 | Ransil et al. | |
| 2010/0094885 A1 * | 4/2010 | Andrews | 707/756 |

* cited by examiner

*Primary Examiner* — Shahid Alam
(74) *Attorney, Agent, or Firm* — Patterson & Sheridan, LLP

(57) ABSTRACT

A method, article of manufacture and apparatus for decomposing an initial query into smaller conditional groups for execution on a database is disclosed. A separate database query may be generated for each of the conditional groups, and the results of executing these separate database queries may be combined and returned as the result of the initial query. Typically, the initial query may be decomposed because it is otherwise too large and/or too complex to be executed directly.

13 Claims, 10 Drawing Sheets

DECOMPOSED QUERY CONDITIONS

CROSS-REFERENCE TO RELATED APPLICATION

This application is a continuation of co-pending U.S. patent application Ser. No. 11/463,364 entitled "DECOMPOSED QUERY CONDITIONS", filed Aug. 9, 2006. Each of the aforementioned related patent applications is herein incorporated by reference in its entirety.

BACKGROUND OF THE INVENTION

1. Field of the Invention

Embodiments of the invention are generally related to computer database systems. More particularly, embodiments of the invention are related to decomposing a particularly long or complex database query into more manageable conditional groups.

2. Description of the Related Art

Databases are computerized information storage and retrieval systems. A relational database management system (RDBMS) is a computer database management system that uses relational techniques for storing and retrieving data. Relational databases are computerized information systems in which data in the form of rows, columns and tables are typically stored on disk drives or similar mass data stores. A database schema is used to specify data is stored in a collection of tables and how the tables are related to one another. Each database table includes a set of rows (also referred to as records) spanning one or more columns.

A database query refers to a set of commands or clauses for retrieving data stored in a database. Database queries may come from users, application programs, or remote systems. A query may specify which columns to retrieve data from, how to join columns from multiple tables, and conditions that must be satisfied for a particular data record to be included in a query result set. Current relational databases typically process queries composed in an exacting format specified by a query language. For example, the widely used query language SQL (short for Structured Query Language) is supported by virtually every database available today.

As a practical matter, a database query may only be so long or complex before reaching the limits of technology. Running large or complex query may use too many resources of a database system, potentially crashing the database or the entire database system. Accordingly, database programs are designed to prevent this result by placing constraints on size or logical-complexity of a query. For example, in IBM's DB2 Universal Database, a query is limited to 64 kilobytes in size. Furthermore, DB2 will reject a query smaller than 64 kilobytes if the query contains too many conditional elements.

However, disciplines which rely heavily on databases, such as life sciences, require increasingly complex databases and database queries. Accordingly, database users encounter query size or complexity limiting constraints more frequently. Often a complex query cannot be performed, or, when the query is performed, its complexity causes the system to operate very slowly.

Accordingly, what is needed is a method and system for executing a complex database query on a database system while not greatly diminishing the performance of the database system.

SUMMARY OF THE INVENTION

Embodiments of the the present invention generally allow a database system to decompose a database query into a collection of decomposed query conditions. Typically, a query may be decomposed because it is too large or too complex (relative to the capabilities of a given database system) to be executed.

One embodiment of the invention includes a method of executing a primary query on a database contained within a database system. The method generally includes decomposing the primary query into a plurality of conditional groups, wherein each conditional group is a fragment of the primary query, and wherein the conditional groups are logically related to one another and generating a secondary query for each of the two or more conditional groups. The method generally further includes executing at least one of the secondary queries, combining the results of the secondary queries based on the logical relationships between the conditional groups, and returning the combined results of the secondary queries as the result of the primary query. In one embodiment, combining the results of the secondary queries may include performing an overquery on the results of the secondary queries, wherein the overquery is evaluated using the results of the one or more secondary queries.

Another embodiment of the invention includes a computer-readable medium containing a program which, when executed on a database contained within a database system, performs an operation. The operation generally includes decomposing the primary query into a plurality of conditional groups, wherein each conditional group is a fragment of the primary query, and wherein the conditional groups are logically related to one another, and generating a secondary query for each of the two or more conditional groups. The operation generally further includes executing at least one of the secondary queries, combining the results of the secondary queries based on the logical relationships between the conditional groups, and returning the combined results of the secondary queries as the result of the primary query.

Another embodiment of the invention includes a system having a database, at least one processor, and a memory containing a database program. The database program may be configured to decompose the primary query into a plurality of conditional groups, wherein each conditional group is a fragment of the primary query, and wherein the conditional groups are logically related to one another and generate a secondary query for each of the two or more conditional groups. The database program may be further configured to execute at least one of the secondary queries, combine the results of the secondary queries based on the logical relationships between the conditional groups, and return the combined results of the secondary queries as the result of the primary query.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
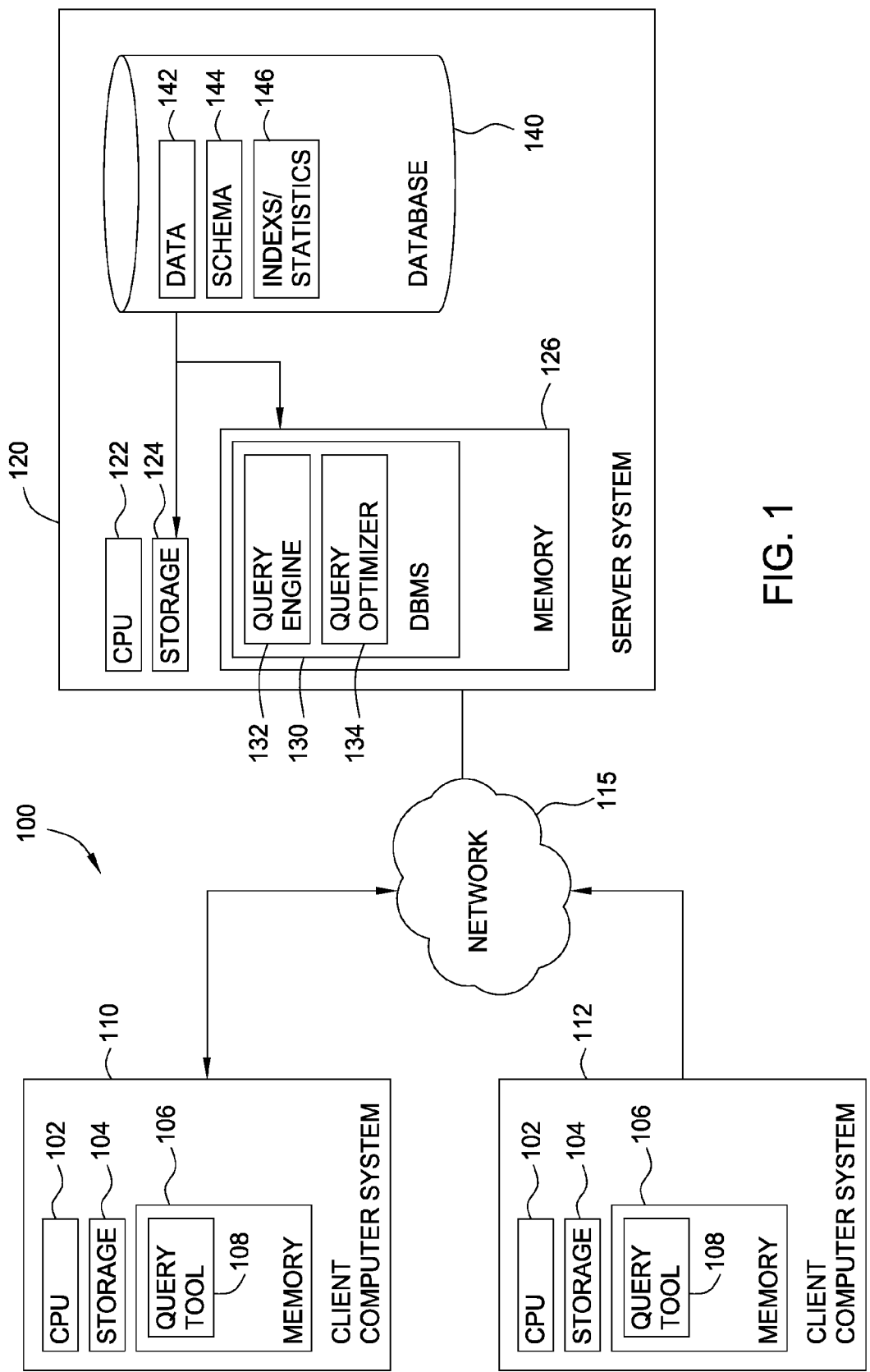
FIG. 1 is a block diagram illustrating a client server view of a computing environment and database system, according to one embodiment of the invention.

Embodiments of the invention provide a mechanism for decomposing an initial query into a set of decomposed conditional groups for execution on a database. Doing so may permit the users of a database to compose and execute database queries that are otherwise too large and/or too complex to be executed directly. Thus, rather than draining a database system of resources while attempting to execute an overly large and/or complex query, such a query may be decomposed and queries representing smaller, more manageable conditional groups may be executed instead.

Embodiments of the invention are described herein relative to the widely used SQL query language. However, the invention is not limited to the SQL query language; rather, embodiments of the invention may be adapted to database queries composed in other query languages. Further, in the following, reference is made to embodiments of the invention. However, it should be understood that the invention is not limited to any specifically described embodiment. Instead, any combination of the following features and elements, whether related to a particular embodiments or not, is contemplated to implement and practice the invention. F Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, network 115 and server system 120. The computer systems 110, 112, and 120 illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104 and memory 106, typically connected by a bus (not shown). CPU 102 is a programmable logic device that performs all the instructions, logic, and mathematical processing performed in executing user applications (e.g., a query tool 108). Storage 104 stores application programs and data for use by client computer systems 110 and 112. Storage 104 includes hard-disk drives, flash memory devices, optical media and the like. Network 115 generally represents any kind of data communications network. Accordingly, network 115 may represent both local and wide area networks, including the Internet. Client computer systems 110 and 112 also include a query tool 108. In one embodiment, the query tool 108 is software application that allows end users to access information stored in a database (e.g., database 140). Query tool 108 may allow users to compose and submit a query to a database management system, which, in response, may be configured to process the query and return a set of query results.

In one embodiment, the query tool allows users to compose a database query without requiring that the user also be familiar with the underlying database query language (e.g., SQL). In such a case, the query tool 108 may be configured to generate a query in the underlying query language based on input provided by a user.

Server 120 includes a CPU 122, storage 124 and memory 126. As shown, server computer 120 also includes a database management system (DBMS) 130 that includes a query engine 132 and a query optimizer 134. The DBMS 130 includes software used to access, search, organize, analyze, and modify information stored in database 140, along with mechanisms for performing other database functions. The query engine 132 may be configured to process database queries submitted by a requesting application (e.g., a query generated using query tool 108) and to return a set of query results to the requesting application. Query optimizer 134 may be configured to receive a query from the requesting application and to optimize the query prior to its execution by the query engine 132. In one embodiment, if a query submitted is either too long or complex (relative to the capability of the database 140, then such a query may be composed into two or more, smaller, and more manageable functional groups.

Database 140 stores the data managed by DBMS 130. At various times, elements of database 140 may be present in storage 124 and memory 126. In one embodiment, database 140 includes data 142, schema 144 and indexes/statistics 146. Data 142 represents the substantive data stored by database 140. Schema 144 provides a description of how the data 142 is represented and organized within a database 140. For a relational database, the schema 144 specifies the tables, columns, and relationships between tables. In addition, schema 144 may specify the data types of columns in a table and any constraints on a table or column. Index/statistics 146 may include various elements of metadata regarding database 140 and may be used in conjunction with query optimizer 134 and schema 144 to optimize a query to more efficiently run on the database 140.

In various embodiments, as described in more detail below, the query optimizer 134 may determine whether a query is too complex or too large to process on database 140. In such a case, query optimizer 134 may be configured to decompose the complex and/or large query into smaller/simpler conditional groups. Each conditional group may be executed as a separate database query (referred to herein as a conditional query). Using logical properties of a query, the results of the conditional queries may be combined to return results that satisfy all of the conditions of the original query.

Note, however, the invention is not limited to situations where a complex or large query cannot be processed, and other reasons for decomposing a query may exist. For example, capabilities of a particular DBMS 130 may necessitate query decomposition with even a relatively simple query. As described in greater detail herein, whether query optimizer 134 selects to decompose a particular query may depend on the content of the particular query and/or on attributes of database 140. Two illustrative examples are provided below. First, FIGS. 2-6 show a general procedure for executing a query with decomposed conditional groups. Second, FIGS. 7-10 outline one method of decomposing a query.

Typically, a query is a set of conditions connected by logical operators, such as "AND" or "OR" which, used to evaluate data from a record in a database. When evaluated, the conditions and record typically yields either a true of a false result. When the record yields a true result, then information requested in the query related to that record is included in the query result. A single query with many conditions may be viewed as multiple smaller queries linked together by logical operators, where the smaller queries each correspond to a conditional group of the original query. The results of the smaller queries may be linked together by the logical operators to obtain the result of the single, larger query. Embodiments of the invention decompose a query into smaller queries, executing the smaller queries, and combine the results.

Figure 2:
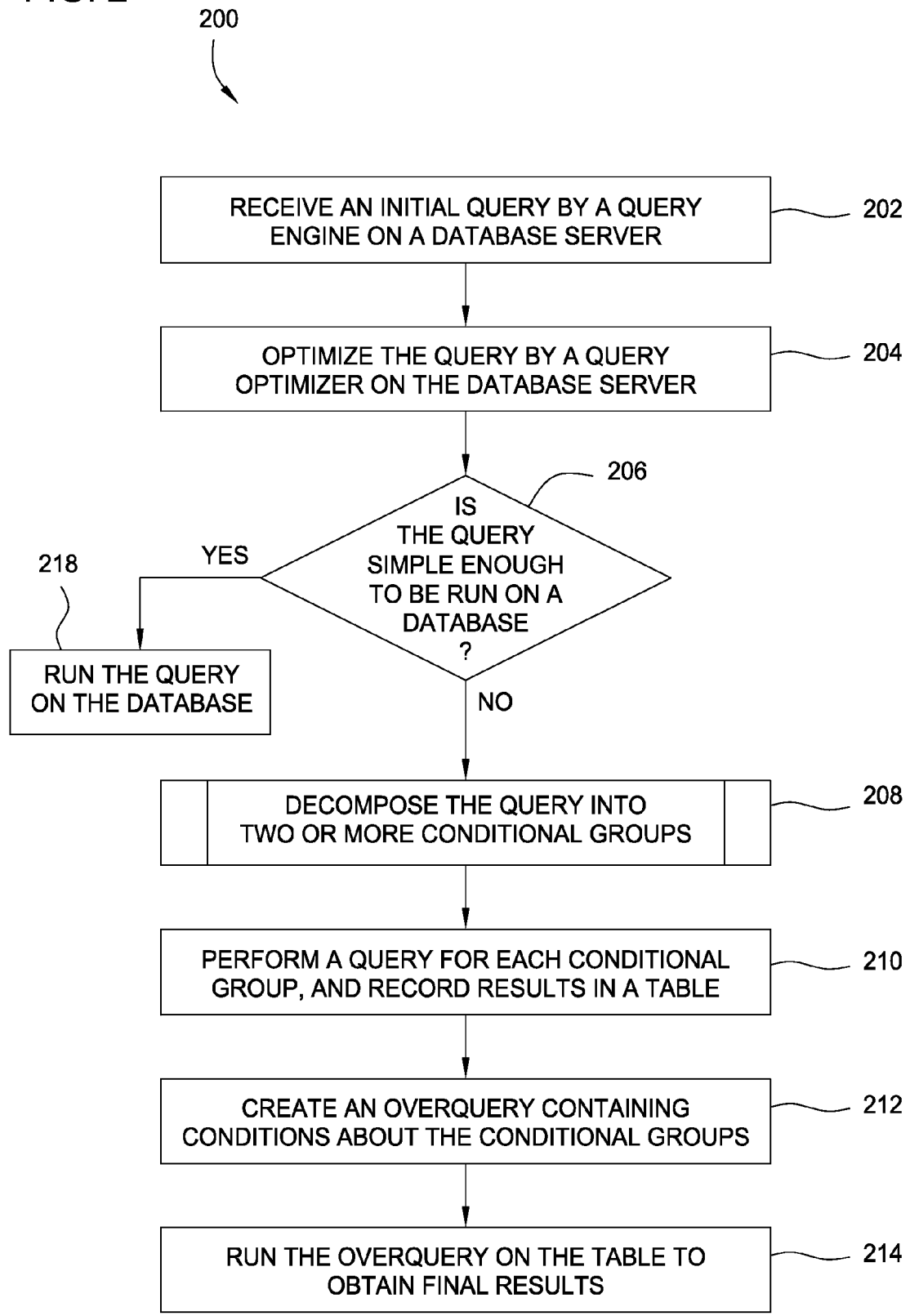
FIG. 2 is a flow diagram illustrating a process for executing a database query, according to one embodiment of the invention.

FIG. 2 is a flow diagram illustrating a process 200 for executing a database query, according to one embodiment of the invention. Illustratively, the process is described with reference to an example illustrated in FIGS. 3-6. One of ordinary skill in the art will recognize that the queries and systems in the example are simplified to highlight aspects of the invention.

Figure 3:
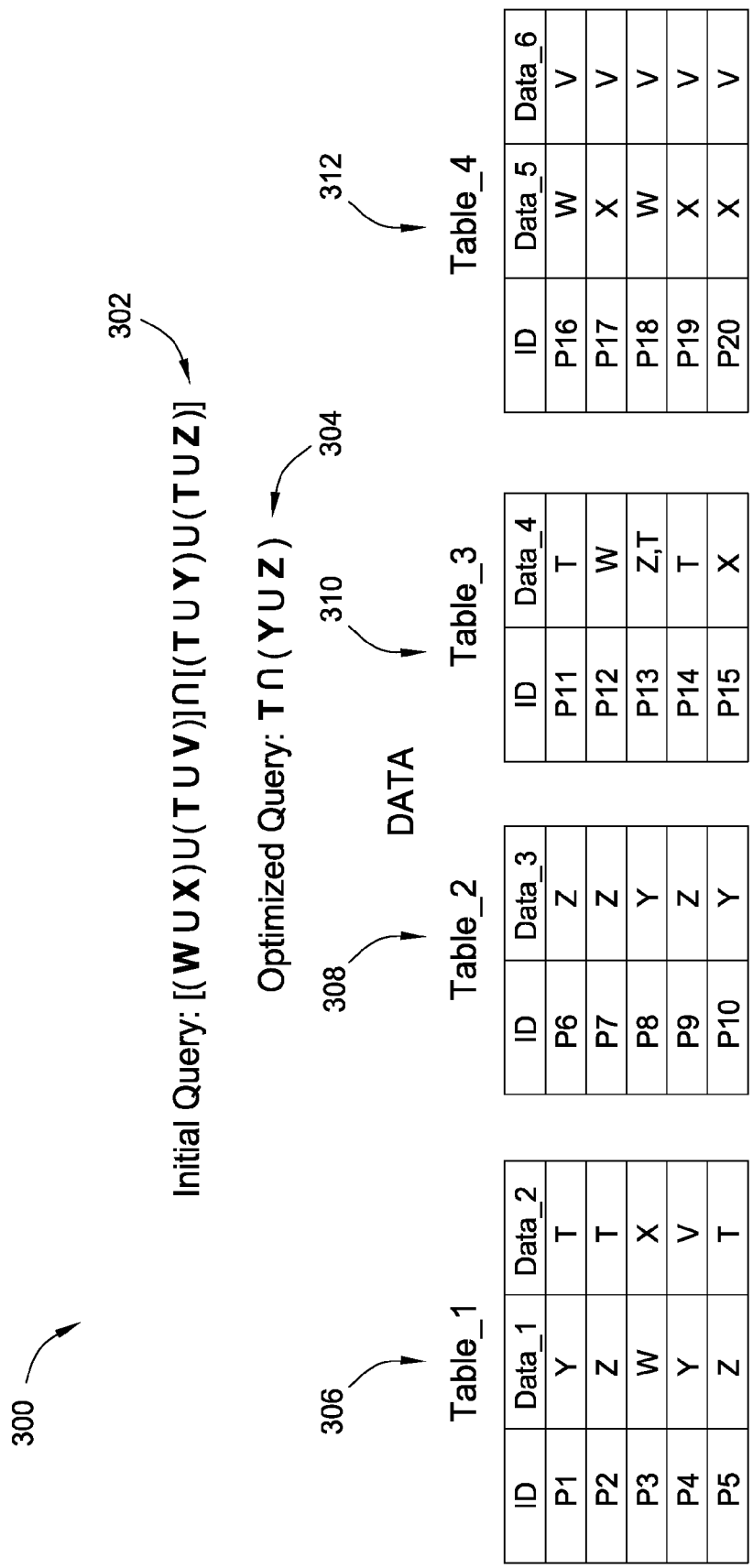
FIG. 3 is a block diagram illustrating a query, an optimized query, and a sample data set, according to one embodiment of the invention.

Process 200 begins at step 202, where database server 120 receives a query from client computer 110. Query 302, shown in FIG. 3, is an example of such a query ([(W OR X) OR (T OR V)] AND [(T AND Y) OR (T AND Z)]), which may be expressed symbolically as [(W ∪ X) ∪ (T ∪ V)] ∩ [(T ∩ Y) ∪ (T ∩ Z)]. In its initial form, the query 302 is dependant on values T, V, W, X, Y, and Z, which may each represent a condition specified by query 302 (e.g., patient_zipcode=77584). Thus, in this example, Table_1 306, Table_2 308, Table_3 310, and Table_4 312 of database 140 may each be queried to return a result for query 302.

At step 204, query 302 may be optimized by optimizer 134 running on database system 120. Query optimizer 134 may utilize properties of Boolean logic as well as schema 144 and indexes/statistics 146 to simplify query 302, and remove any unnecessary dependencies. An unnecessary dependency may include an aspect of the query that is logically irrelevant to whether a particular data record is included in query results. (e.g., the dependency may cancel out if the query is manipulated correctly or the dependency may be true for every record in the database and therefore may be ignored). Illustratively, query 302 may be simplified to optimized query 304, T ∩ (Y ∪ Z), through a combination of steps using the distributive, the associative, the commutative, and the absorptive properties of Boolean logic. By optimizing query 302, the query's dependence on the values W, X, and V has been removed. Consequently, optimized query 304 no longer requires data from Table_4 312, since the table contains no T, Y, or Z. Query optimizer 134 may perform other optimizations as well.

At step 206, query optimizer 134 may determine whether database 140 may execute query 304. If the query is sufficiently simple, then query execution may proceed to step 218 where the query may be executed by database 140, and the query results may be sent to the requesting computer. If, however, query optimizer 134 determines that the query is too long or too complex, then at step 209, the query may be decomposed into two or more conditional groups, which is described in more detail below. As described above, a conditional group is a fragment of an original query joined to one or more other conditional groups by a conditional statement, such as AND or OR.

Figure 4:
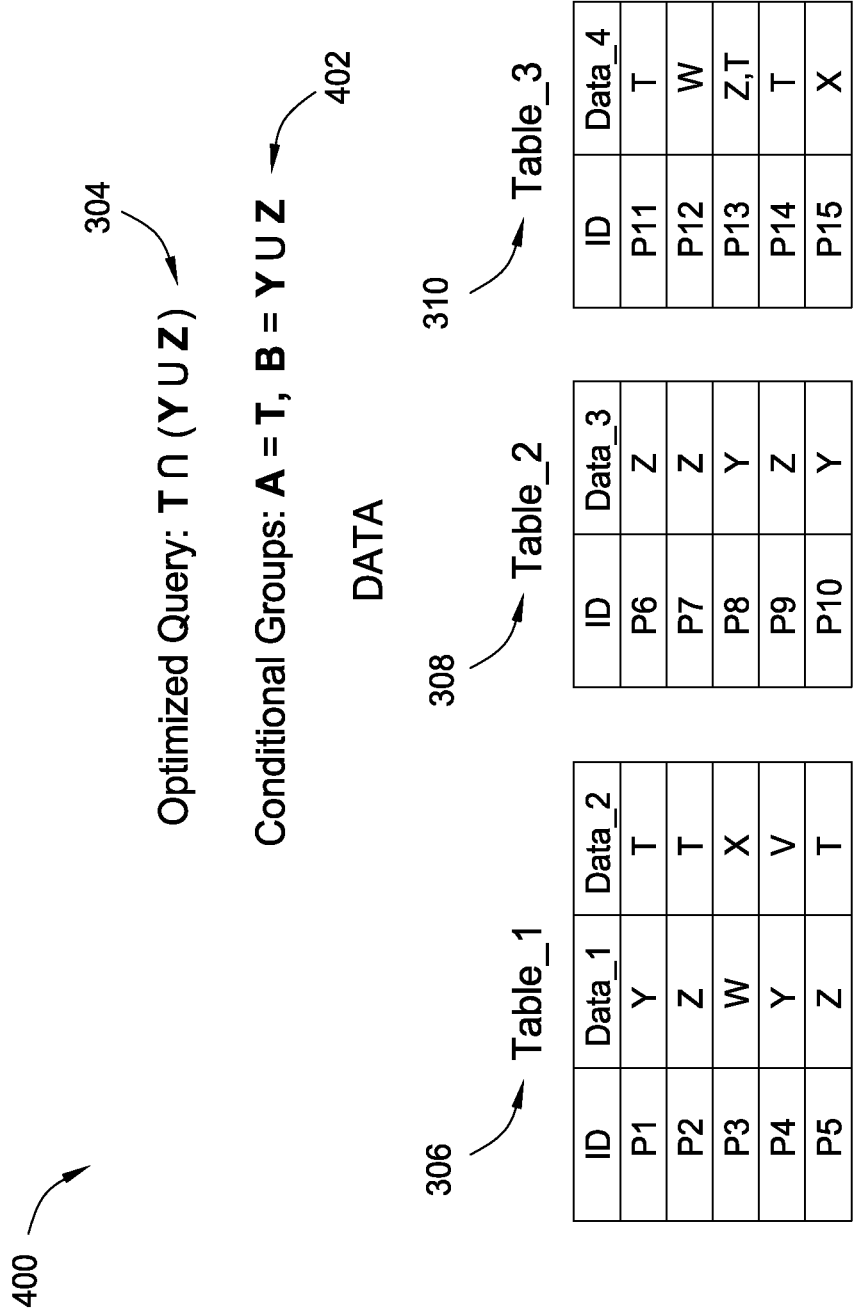
FIG. 4 is a block diagram illustrating an optimized query, conditional groups, and a sample data set, according to one embodiment of the invention.

Using query 304 as an example, assume database 140 is limited to executing queries with no more than one logical operator joining two conditions. Thus, the optimized query 304, T AND (Y OR Z), may not execute on database 140 without further processing since optimized query 304 contains two logical operators. In one embodiment, optimized query 304 may be decomposed into two or more conditional groups 402 in order to execute a query that is either too long or too complex. FIG. 4 illustrates one potential decomposition of optimized query 304, specifically into conditional groups A=T, and B=Y ∪ Z. In other words query 304, may be decomposed into conditional groups represented by "A" and the condition represented by "B". Each of these conditional groups satisfies the operational constraints of database 140 (i.e., a query may include at most one logical operator).

Figure 5:
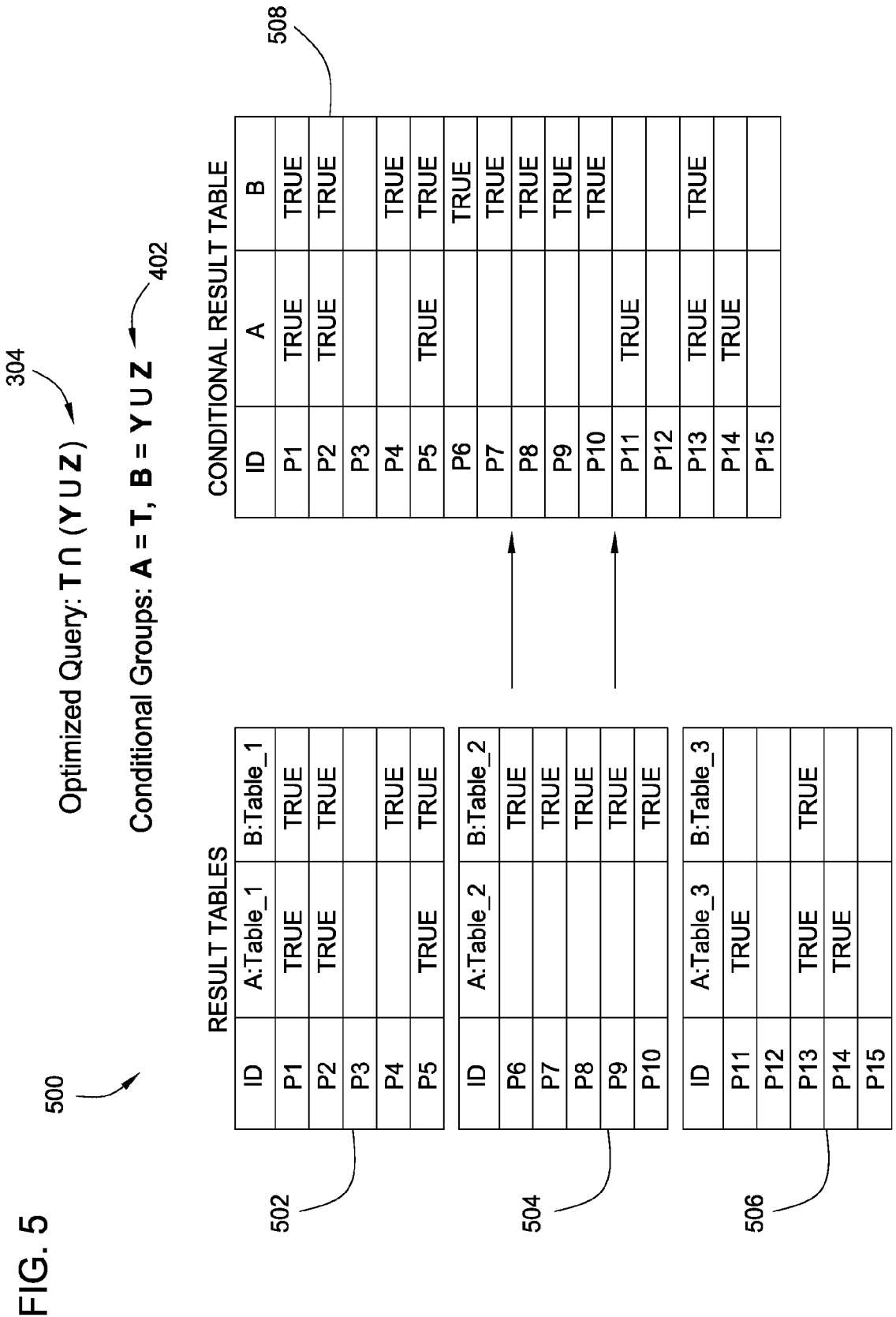
FIG. 5 is a block diagram illustrating data result tables generated by performing queries associated with the conditional groups, according to one embodiment of the invention.

At step 210, once initial query 302 has been optimized and decomposed into conditional groups 402, a query may be performed for each conditional group, and the results of each query may be stored. For example, when queries corresponding to conditional groups 402 are executed using data from Table_1 306, Table_2 308, and Table_3 310, result tables 502, 504, and 506 may be produced, as is illustrated in FIG. 5. The individual result tables 502, 504, and 506 may be combined into a single conditional result table 508.

Figure 6:
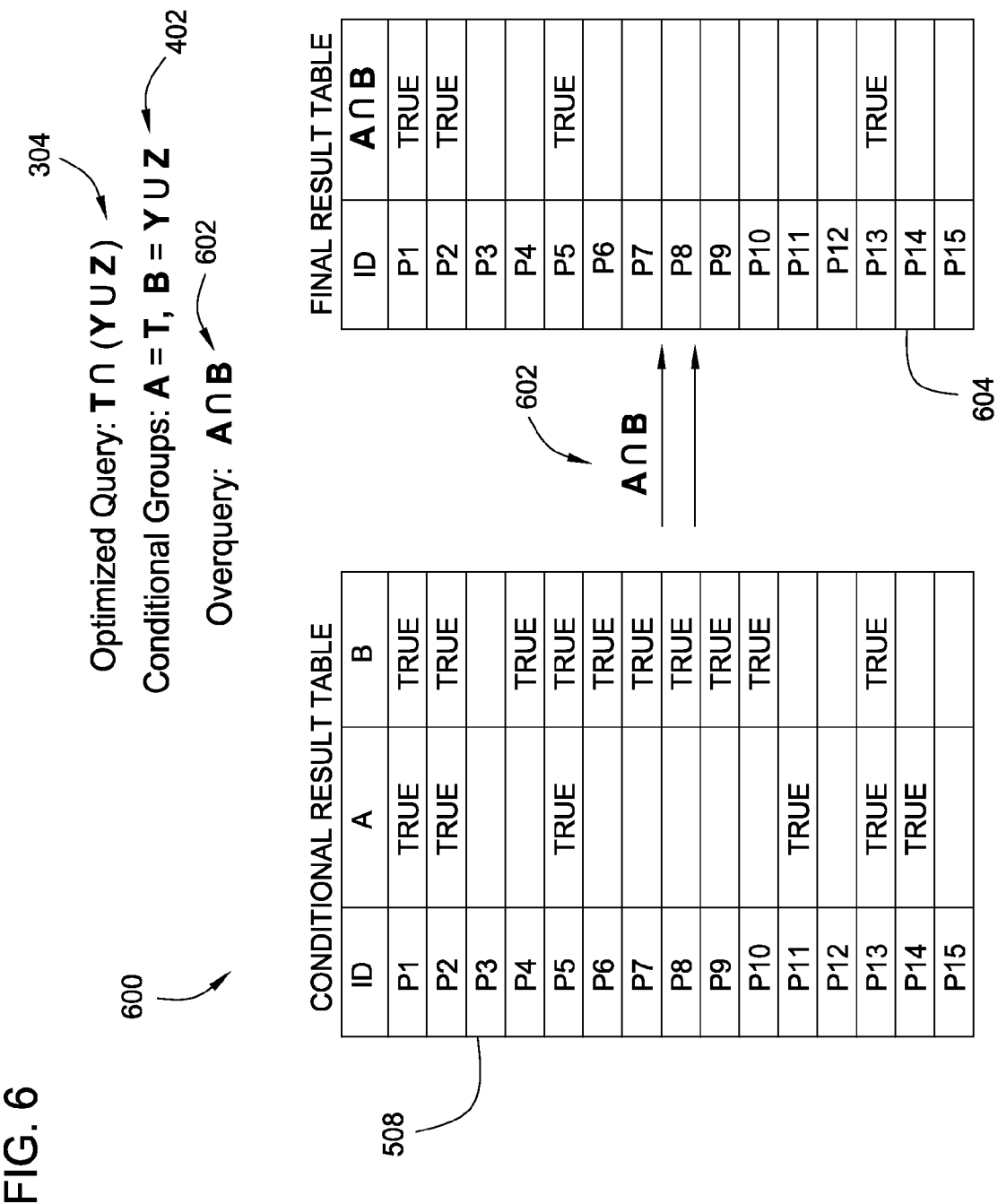
FIG. 6 is a block diagram illustrating an overquery queried on the data result table to generate the final results of a query, according to one embodiment of the invention.

At step 212, DBMS 130 may generate an overquery 602. In one embodiment, an overquery describes the conditional relationship(s) of two or more conditional groups 402. At step 214, the overquery 602 is executed on conditional result table 508, thereby combining the results of the conditional queries to return results related to the original query. FIG. 6 illustrates executing overquery 602, A AND B, on conditional result table 508 to produce final result table 604, in which final results 606 of the initial query 302 may be seen.

As described above, a query that exceeds the operational requirements of a database (e.g., due to length or complexity) may be decomposed into smaller executable queries 402. And the results may be combined using an overquery 602. In terms of a pseudo-code SQL query, process 200 has caused the initial query 302:

```
SELECT ID
FROM Table_1
JOIN Table_2
JOIN Table_3
JOIN Table_4
WHERE [(W OR X) OR (T OR V)] AND [(T AND Y) OR (T AND Z)]
``` to be implemented as a combination of queries corresponding to conditional groups 402:

```
SELECT ID
FROM Table_1
JOIN Table_2
JOIN Table_3
WHERE T
SELECT ID
FROM Table_1
JOIN Table_2
JOIN Table_3
WHERE Y OR Z
``` and the overquery 602:

```
SELECT ID
FROM Conditional_Result_Table
WHERE A AND B
```

Therefore, using an example database 140 where only one logical operator is allowed, the queries corresponding to conditional groups 402 and the overquery 602 may be executed, whereas initial query 302 and optimized query 304 would otherwise be rejected by the database 140. Of course, one of skill in the art will recognize that that the example of a database constraint limiting queries to a single logical operator is simplified to highlight aspects of the present invention.

In one embodiment, a query corresponding to one or more conditional groups may not be executed on database 140, but rather may be included within the overquery. In this case, the overquery may execute on the results of previous queries as well as the database 140. In other words, not all of the conditional groups need to be executed as separate queries. For example, in the scenario described above, the query associated with conditional group A may not be executed. Rather, the query associated with conditional group B may be executed, and then the overquery T AND B may be used to obtain the final results 606. Accordingly, two queries (Y OR Z→B and T AND B→Results) may be used to obtain the same results as the three queries described above (T→A, Y OR Z→B, and A AND B→Results).

In one embodiment, the process 200 may be used with dynamic data queries (DDQ). DDQs are a form of natural language query in which the query is translated into the language of a given database (e.g., SQL) according to known characteristics of the database. Given the query generating aspects of DDQs, they may easily become too large or complex for a database and therefore may be well suited for application of process 200.

In one embodiment, the query optimizer 134 may be configured to decompose and process a query. Alternatively, a separate application within the DBMS 130 may control the creation and execution of conditional groups and the overquery.

In one embodiment, the optimizer 134 may interact with schema 144 to eliminate unnecessary searches and make a query more efficient. For example, the optimizer 134 may determine that Table_2 308 does not contain any records satisfying the condition represented by "T", and therefore does not need to be queried as it will not return any positive results from the optimized query 304. Additionally, the optimizer 134 may be configured to recognize that the conditional relationship between A and B is such that the final result table 604 is a subset of the result of the query corresponding to A. Thus, rather than querying the entire database 140 when executing the query corresponding to B, the query may be limited to records which have previously been determined to satisfy the conditions of A. One skilled in the art will recognize that many other techniques exist for improving the efficiency or capability of a database, and that the process 200 is not limited solely to the query techniques and database configurations discussed herein.

As described above, process 200 may be used to execute a complex or large query by decomposing the query into multiple conditional groups. A variety of techniques may be used to generate the conditional groups from a given query that is too large or complex to execute directly. FIGS. 7-10 illustrate one exemplary process for decomposing a query into a set of conditional groups.

Figure 7:
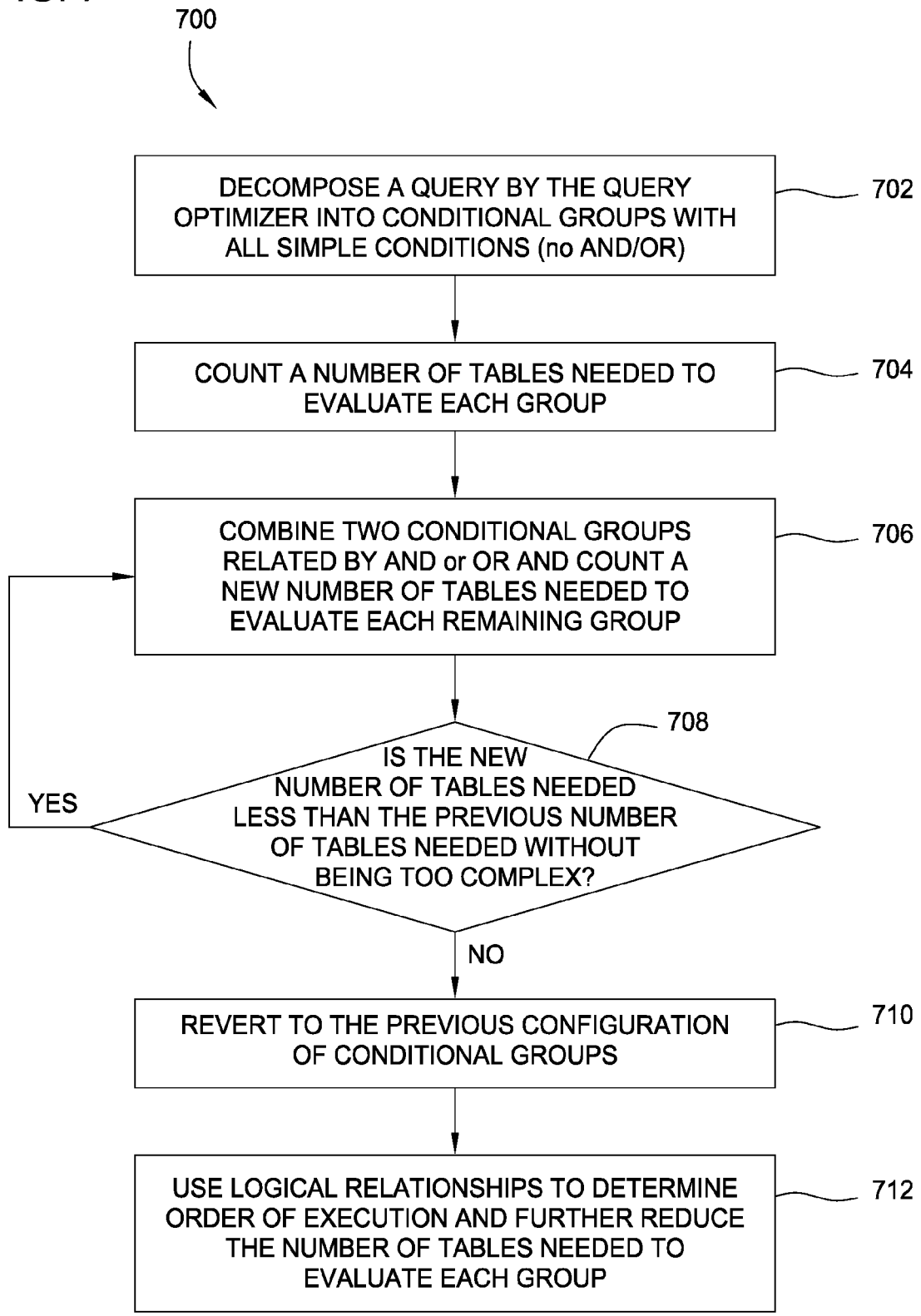
FIG. 7 is a flow diagram illustrating the optimization of conditional groups, according to one embodiment of the invention.

FIG. 7 illustrates a process 700 for creating a set of conditional groups from a query that is too large or complex to execute directly, according to one embodiment of the invention. The conditional groups may then be optimized in the DBMS 130 to minimize access to the database 140. The process 700 is described below with reference to an example illustrated in FIGS. 8-10.

Figure 8:
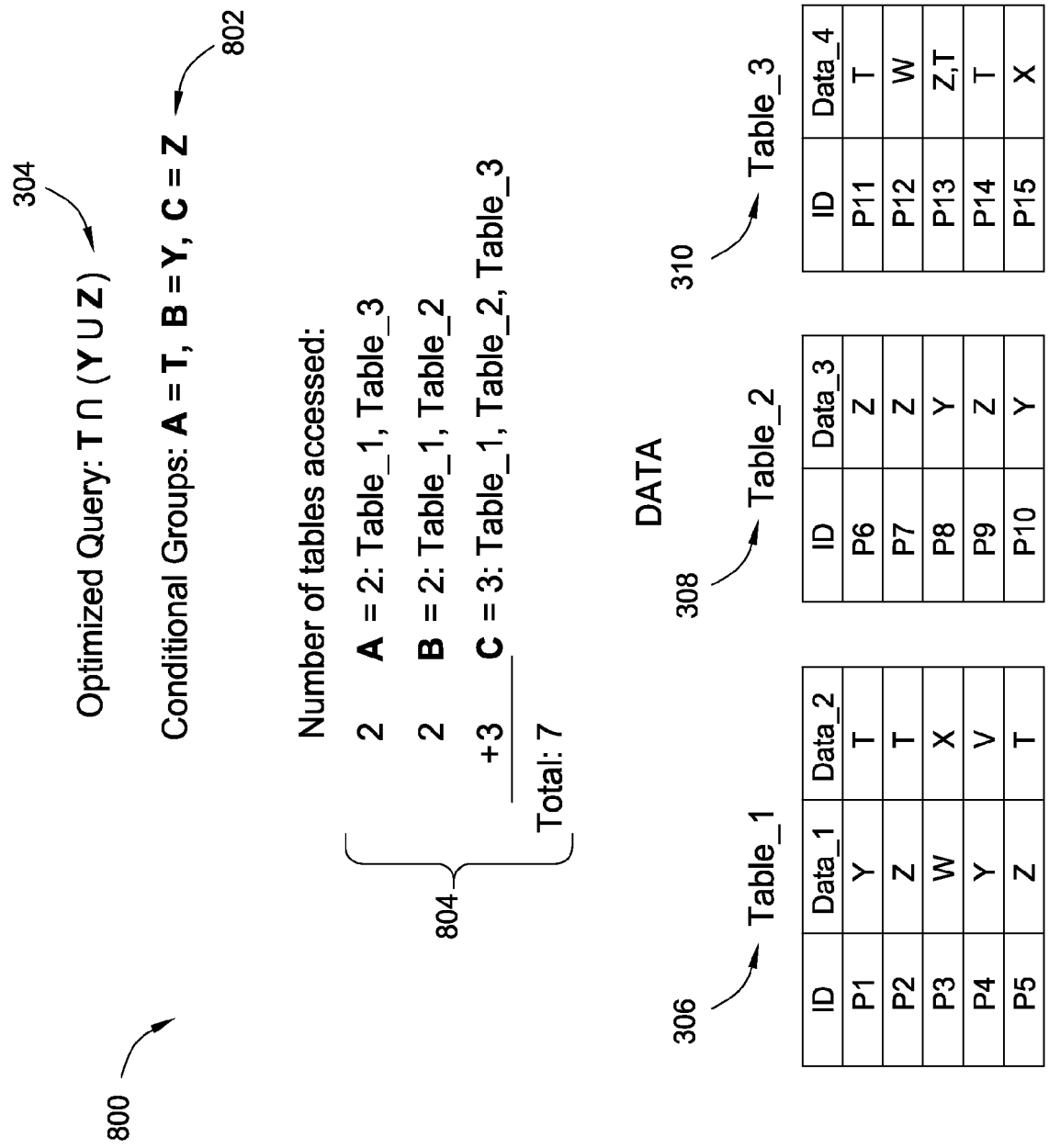
FIG. 8 is a block diagram illustrating an optimized query, conditional groups, a total number of tables needed, and a sample data set, according to one embodiment of the invention.

Process 700 begins at 702, where the optimizer 134 decomposes an query (e.g., query 304) into conditional groups. For example, FIG. 8 illustrates conditional groups 802 A, B, and C, generated from query 304. As shown, conditional groups 802 are each "simple conditions." That is, conditional groups contain no logical operators, as can be seen in conditional groups 802 in FIG. 8.

At step 704, the optimizer 134 may be configured to determine how many (and which) tables are required to execute a query corresponding to each individual conditional group generated at step 702. FIG. 8 shows the results of the determination made at step 704 in calculation 804. Illustratively, conditional group A requires access to 2 tables, conditional group B requires access to 2 tables, and conditional group C requires access to 3 tables, for a total of seven table accesses. Thus, if conditional groups 802 are executed as individual queries (e.g., as part of step 210 of process 200), tables 306, 308, and 310 would be accessed a collective total of 7 times.

Figure 9:
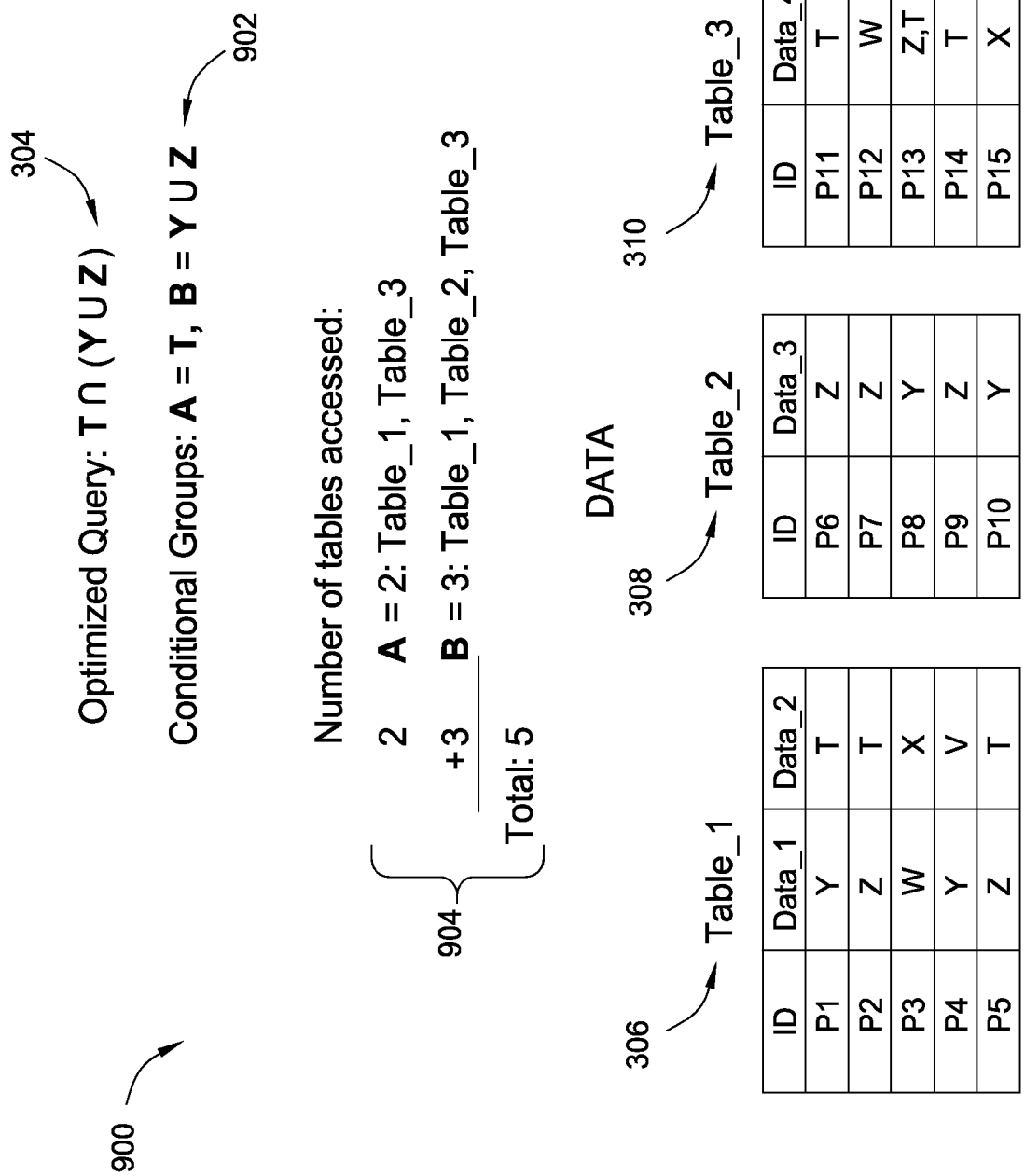
FIG. 9 is a block diagram illustrating the optimized query, a different set of conditional groups, a new total number of tables needed, and the sample data set, according to one embodiment of the invention.

At step 706, two conditional groups are combined by a logical operator. For example, conditional groups B=Y and C=Z may be combined to yield B=Y OR Z. FIG. 9 shows this combination in conditional group 902. The OR used to combine conditional groups B and C operator was chosen because Y and Z were originally joined by OR in the optimized query 304. The selection of conditional groups for combining may be random, or may follow a set pattern. For example, such patterns may include selection of the centermost conditional groups in a query, or the conditional groups most deeply nested in the optimized query 304 (as is the case in the present example).

After combining two conditional groups, a new total number of tables accessed 904 is then determined. This may be seen in FIG. 9, where a conditional group A requires access to 2 tables, and a conditional group B requires access to 3 tables, for a total of five. Therefore, were the conditional groups 902 executed as a query, tables 306, 308, 310 would be accessed a collective total of 5 times.

At step 708, the previous number of table accesses is compared to the new number of table accesses. If the new number of table accesses is less than or equal to the previous number of table accesses while the conditional groups remain within the complexity and size restraints of the system, execution of the process 700 returns to step 706, where two additional conditional groups are combined and a new number of table accesses is determined.

Otherwise, the new number of table accesses is greater than the previous number of table accesses, or if one of the conditional groups is too complex or large for the database 140, the conditional groups revert to their previous configuration, as in step 710. Continuing with the example from above, since combining conditional groups 902 would result in a query too complex for database 140, (i.e., at most one logical operator per query) the conditional groups 902 are selected in step 710.

Figure 10:
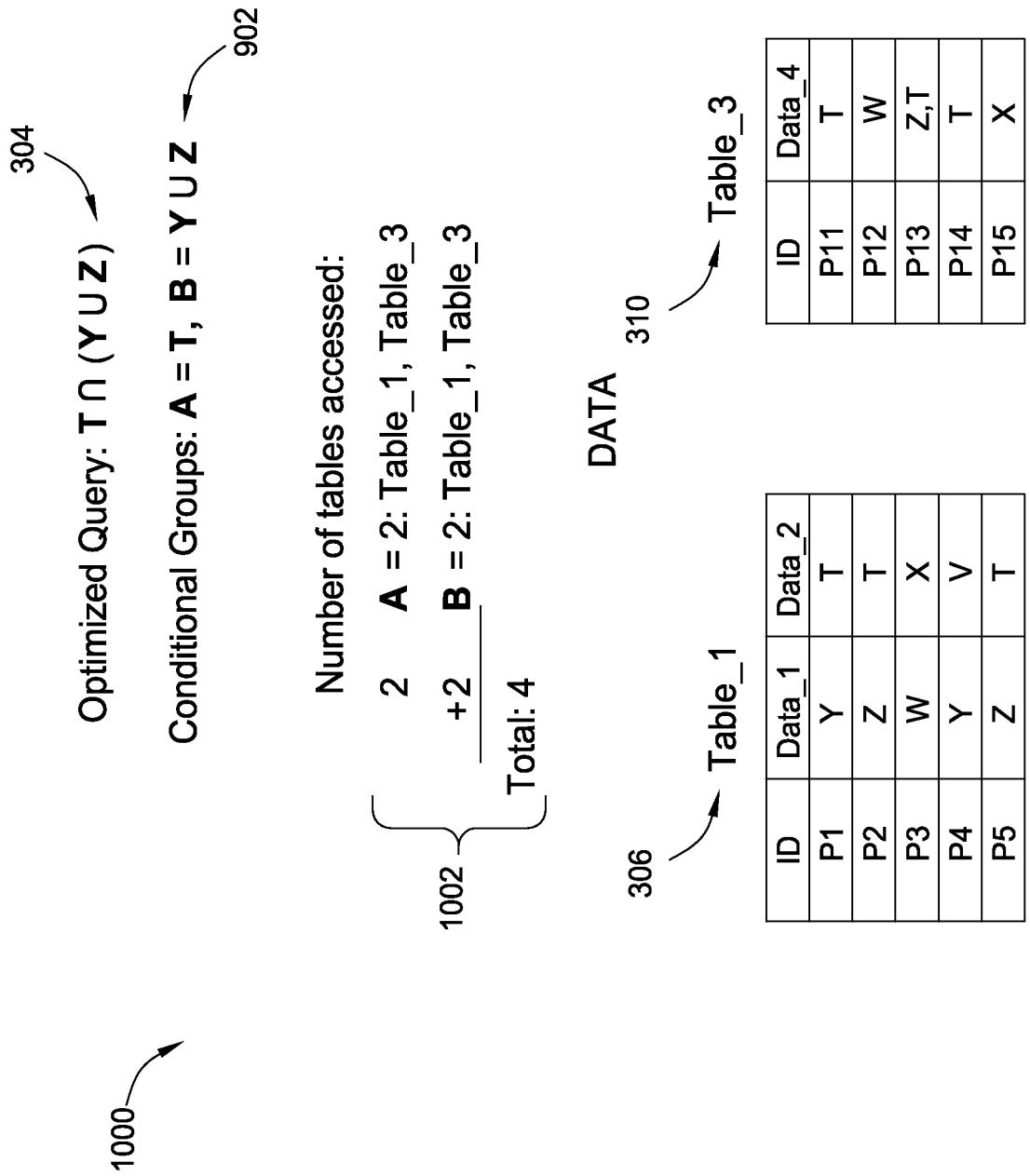
FIG. 10 is a block diagram illustrating the optimized query, the set of conditional groups, a reduced number of tables needed, and a reduced sample data set, according to one embodiment of the invention.

At step 712, the query optimizer 134 may use the logical relationships of the conditional groups and schema 144 to determine an order of execution of the conditional queries that may further reduce the number of tables needed to evaluate each group. For example, the number of tables accessed 1002 in FIG. 10 is less than the previous number of tables accessed 904, although the conditional groups 902 remain unchanged. The further narrowing of necessary tables is possible because the optimizer 134 may determine that Table_2 308 will never satisfy conditional group A, and as such will never satisfy the overquery A AND B, as discussed above.

The process 700 may result in an optimized set of conditional groups. Other techniques for decomposing a query into conditional groups are within the scope of the invention. In one embodiment, an initial query may be decomposed into conditional groups of a set size or which contain a set number of logical operators. In another embodiment, an initial query may be decomposed into two conditional groups, which may then be scanned for complexity and/or size. If one or both of the conditional groups is still not within the required limits of a query, the single-decomposition process may repeat until the resulting conditional groups are within the required bounds of complexity and size.

Advantageously, embodiments of the invention provide a mechanism for decomposing an initial query which is to large to be executed into smaller queries that may be executed. Doing so may permit the users of a database to compose a large and/or complex query on a database system without actually executing the entire large and/or complex query at once on the database. Thus, rather than monopolizing the system resources of a database system while attempting to execute the large and/or complex query, the decomposed, smaller queries may improve efficiency and usage of system resources.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing a program which, when executed on a database contained within a database system, performs an operation, comprising:
   decomposing the primary query into a plurality of conditional groups, wherein each conditional group is a fragment of the primary query, and wherein the conditional groups are logically related to one another;
   generating a secondary query for each of the two or more conditional groups;
   executing at least one of the secondary queries;
   combining the results of the secondary queries based on the logical relationships between the conditional groups; and
   returning the combined results of the secondary queries as the result of the primary query.

2. The non-transitory computer-readable medium of claim 1, wherein the primary query is decomposed into conditional groups after the query is optimized.

3. The non-transitory computer-readable medium of claim 1, wherein the database system uses the logical relationships between the conditional groups to determine an order of execution of the secondary queries.

4. The non-transitory computer-readable medium of claim 3, wherein at least one secondary query is evaluated using results of an earlier performed secondary query.

5. The non-transitory computer-readable medium of claim 1, further comprising optimizing the conditional groups prior to executing the secondary queries, wherein the conditional groups are optimized for one or more of efficiency, table usage, properties of the database system, and properties of data in the database.

6. The non-transitory computer-readable medium of claim 1, wherein logical relationship between two conditional groups comprises an AND or OR logical relationship.

7. The non-transitory computer-readable medium of claim 1, wherein the primary query is too logically complex to be executed directly by the database system.

8. The non-transitory computer-readable medium of claim 1, wherein the primary query is too large in size to be executed directly by the database system.

9. The non-transitory computer-readable medium of claim 1, wherein combining the results of the secondary queries performing an overquery on the results of the secondary queries, wherein the overquery is evaluated using the results of the one or more secondary queries.

10. A system, comprising:
a database;
at least one processor; and
a memory containing a database program configured to:
  decompose the primary query into a plurality of conditional groups, wherein each conditional group is a fragment of the primary query, and wherein the conditional groups are logically related to one another,
  generate a secondary query for each of the two or more conditional groups,
  execute at least one of the secondary queries,
  combine the results of the secondary queries based on the logical relationships between the conditional groups, and
  return the combined results of the secondary queries as the result of the primary query.

11. The system of claim 10, wherein the primary query is too logically complex to be executed directly by the database system.

12. The system of claim 10, wherein the primary query is too large in size to be executed directly by the database system.

13. The system of claim 10, wherein combining the results of the secondary queries performing an overquery on the results of the secondary queries, wherein the overquery is evaluated using the results of the one or more secondary queries.

* * * * *